(12) United States Patent
Thibert et al.

(10) Patent No.: US 6,490,449 B1
(45) Date of Patent: Dec. 3, 2002

(54) SYSTEM AND METHOD OF AUTOMATIC ROAMING ANALYSIS (ARA) FOR DIALING ABBREVIATED NUMBERS IN A WIRELESS INTELLIGENT NETWORK

(75) Inventors: Myriam Thibert, Lasalle (CA); Paul Gantous, Montreal (CA); Charles Gelibet, Pierrefonds (CA); Giuseppe Conte, Montreal (CA); Lysanne Gauthier, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/303,026

(22) Filed: Apr. 30, 1999

Related U.S. Application Data (60) Provisional application No. 60/099,645, filed on Sep. 9, 1998.

(51) Int. Cl.[7] .................................................. H04Q 7/20
(52) U.S. Cl. ...................................... 455/433; 455/461
(58) Field of Search ................................. 455/452, 435, 455/565, 461, 433, 436, 414, 422; 379/212.01, 216.01

(56) References Cited

U.S. PATENT DOCUMENTS

| | | | | |
|---|---|---|---|---|
| 5,305,372 A | * | 4/1994 | Tomiyori | 379/355.07 |
| 5,440,614 A | * | 8/1995 | Sonberg et al. | 455/432 |
| 5,497,412 A | * | 3/1996 | Lannen et al. | 455/432 |
| 5,504,804 A | * | 4/1996 | Widmark et al. | 455/414 |
| 5,506,888 A | * | 4/1996 | Hayes et al. | 455/445 |
| 5,898,917 A | * | 4/1999 | Batni et al. | 379/216.01 |
| 5,903,832 A | * | 5/1999 | Seppanen et al. | 455/414 |
| 5,924,035 A | * | 7/1999 | Joensuu | 455/445 |
| 5,978,678 A | * | 11/1999 | Houde et al. | 455/433 |
| 6,026,298 A | * | 2/2000 | Lamb et al | 455/433 |
| 6,044,264 A | * | 3/2000 | Huotari et al. | 455/414 |
| 6,070,080 A | * | 5/2000 | Madour et al. | 455/458 |
| 6,122,510 A | * | 9/2000 | Granberg | 455/433 |
| 6,141,549 A | * | 10/2000 | Nguyen | 455/433 |
| 6,298,234 B1 | * | 10/2001 | Brunner | 370/400 |
| 6,324,396 B1 | * | 11/2001 | Vasa et al. | 455/415 |
| 6,327,355 B1 | * | 12/2001 | Britt | 379/201.03 |
| 6,397,058 B1 | * | 5/2002 | Thibert et al. | 455/414 |

FOREIGN PATENT DOCUMENTS

| | | | |
|---|---|---|---|
| EP | 0530010 | * | 8/1992 |
| EP | 0 530 010 A2 | | 3/1993 |
| WO | WO 97/42781 | | 11/1997 |
| WO | WO 97/47151 | | 12/1997 |
| WO | WO 99/59717 A1 | * | 11/1999 |
| WO | WO 00/14992 A1 | * | 3/2000 ............ H04Q/7/38 |

* cited by examiner

*Primary Examiner*—Vivian Chin
*Assistant Examiner*—Charles N. Appiah
(74) *Attorney, Agent, or Firm*—Smith & Danamraj

(57) ABSTRACT

A system and method of providing an intelligent automatic roaming analysis (ARA) that enables a roaming mobile subscriber to use abbreviated dialing regardless of the location of the subscriber in a radio telecommunications network. The radio telecommunications network includes a home network which comprises a Home Location Register (HLR) and a Service Control Point (SCP). The visited exchanges of the network are categorized by a type indicator if located outside the home service area. Subscription data and operator service data are provided as a database in the SCP, wherein applicable telephone codes are available for the home network and the visited exchanges. Based on the type of the visited exchange, an abbreviated number is rebuilt into an appropriate called party number (B-number) by utilizing one or more services provided in the SCP.

28 Claims, 9 Drawing Sheets

| MSC NAME | MSCID | IAC | NAC | CCD | ACD |
|---|---|---|---|---|---|
| MONAX 1 | 418-41 | 011 | 1 | 1 | 514 |
| DINGO 2 | 440-52 | 011 | 1 | 1 | 514 |
| ⋮ | ⋮ | ⋮ | ⋮ | ⋮ | ⋮ |

FIG. 3A

| MSC NAME | MSCID | TYPE | IAC | NAC | CCD | ACD |
|---|---|---|---|---|---|---|
| QUEBEC 1 | 16401-2 | LOCAL | 011 | 1 | 1 | 418 |
| • | • | • | • | • | • | • |
| • | • | • | • | • | • | • |
| DALLAS 1 | 808-24 | NAT | 00 | 1 | 2 | 214 |
| • | • | • | • | • | • | • |
| • | • | • | • | • | • | • |
| ET_GO | 819-1 | INT | 00 | 0 | 44 | 27 |
| • | • | • | • | • | • | • |
| • | • | • | • | • | • | • |

SYSTEM AND METHOD OF AUTOMATIC ROAMING ANALYSIS (ARA) FOR DIALING ABBREVIATED NUMBERS IN A WIRELESS INTELLIGENT NETWORK

PRIORITY UNDER 35 U.S.C. § 119(e) & 37 CFR § 1.78

This nonprovisional application claims priority based upon the following prior filed copending U.S. provisional patent application entitled "System and Method of Automatic Roaming Analysis (ARA) for Dialing Abbreviated Numbers in a Wireless Intelligent Network (WIN)," Ser. No.: 60/099,645, filed Sep. 9, 1998, in the names of Myriam Thibert, Paul Gantous, Charles Gelibet, Giuseppe Conte and Lysanne Gauthier.

BACKGROUND OF THE INVENTION

1. Technical Field of the Invention

This invention relates to telecommunication systems and, more particularly, to a system and method of automatic roaming analysis (ARA) for dialing abbreviated numbers in a wireless intelligent network (WIN), wherein a mobile subscriber can enter abbreviated numbers for originating calls regardless of the subscriber's location in the network.

2. Description of Related Art

For today's users of radio telecommunications services (also commonly known as mobile subscribers), short digit dialing (SDD) or speed dialing is a distinct advantage over conventional dialing where all digits comprising the complete telephone number of a called party need to be entered. Almost all available mobile phones have an abbreviated dialing memory in order to facilitate the dialing of frequently used numbers.

The conventional method to use abbreviated dialing, where the number stored in the memory is read from the memory as such, is typically useful only in a portion of a radio telecommunications network such as, for example, a home network portion associated with the mobile subscriber. Clearly, such a limitation would severely reduce the usefulness of the SDD feature to a roaming mobile subscriber.

Unfortunately, commonly available current solutions that attempt to address this limitation in the conventional abbreviated dialing are not adequate or satisfactory because they are merely extensions of the memory-based scheme. For example, assume that a telephone number in Country X, say, 90 123456 is entered into the abbreviated dialing memory of a mobile phone. Obviously, it is returned in the same form, when it is read out from the memory for effectuating abbreviated dialing. If the subscriber is traveling in Country Y and from there wants to place a call to the same telephone number in Country X, the subscriber cannot use the same abbreviated dialing facility, because the subscriber now has to enter the number including applicable international access codes. Thus, in this example, the subscriber has to dial the number 099 358 0 123456. Accordingly, for the same telephone number in Country X (local number), the subscriber would have to program a different number for calls originated from each country or region located within the coverage area of the network. It can be readily appreciated that this scheme requires a large memory for the storage of numerous variations of a single local number. Further, the mobile subscriber has to remember the abbreviated memory locations for all the variations of the same number, so that only the right memory location is read out, depending on the country or region in which the subscriber is located while placing the call.

Moreover, the problems associated with the conventional abbreviated dialing methods are exacerbated in radio telecommunications networks that cover larger number of countries, thereby greatly reducing the usefulness of the feature to international travelers.

Accordingly, based upon the foregoing discussion, it should be readily appreciated that in order to overcome the deficiencies and shortcomings of the existing solutions, it would be advantageous to have a method and system for providing an intelligent automatic roaming analysis that enables a roaming mobile subscriber to use abbreviated dialing regardless of the location in a radio telecommunications network. The present invention provides such a method and system.

SUMMARY OF THE INVENTION

In one aspect, the present invention is related to a method of supporting a short digit dialing (SDD) service for a roaming mobile subscriber in a radio telecommunications system of the type which includes a plurality of visited exchanges. Each visited exchange is provided with an identity indicator (MSCID). For a visited exchange outside the home area (called visited service area), it is also provided with a type designation. A home network is included which comprises at least a visited exchange, a Home Location Register (HLR), and a Service Control Point (SCP), either coupled or not to the HLR. The SCP's database includes a subscriber data set and an operator service data set, and a service execution portion relating to the short digit dialing service. The method comprises populating the subscriber data set with at least an International Access Code (IAC), a National Access Code (NAC), a Country Code (CCD) and an Area Code (ACD) for the home network, in addition to the MSCIDs of the exchanges therein. The method also involves populating the operator service data set at least with a visited exchange's type that serves a visited service area, and an IAC, an NAC, a CCD and an ACD, and an MSCID for the visited exchange of the visited service area. When a mobile subscriber dials an abbreviated number from a visited exchange, a determination is made in the SCP whether the mobile subscriber is located in a visited exchange. If so, the type designation of the visited service area exchange is determined. A call treatment instruction may be received in the SCP either from the HLR or from the visited exchange. The call treatment instruction preferably includes at least the MSCID of the exchange. The SCP performs a translation process on the abbreviated number to generate a translated number (TN). Then the SCP determines if the mobile subscriber is roaming. Based on the type designation of the visited exchange, a called party number (B-number) is selectively rebuilt using the TN in the SCP. The originated call is selectively terminated using the B-number.

In another aspect, the present invention is directed to a radio telecommunications network system covering a geographic area comprised of a plurality of service areas, each of which is served by a mobile switching center (MSC) having an identification indicator (MSCID). The system includes an SCP for supporting a customer service data set associated with a mobile subscriber, an operator service data set for global definition of the visited MSCs, and roaming detecting means for detecting whether the mobile subscriber is visiting the visited service area. The customer service data set includes a first plurality of telephone number code portions associated with an MSC serving a home service area of the mobile subscriber. The operator service data set includes a second plurality of telephone code portions associated visited MSC serving a visited service area and a type portion for designating a type parameter for the visited MSC. In the network system, there are means available to the mobile subscriber for entering a short digit dial number associated with a called party's telephone number. Also included in the network system is an HLR that may be operably coupled to the SCP. The HLR provides a call treatment instruction in response to a service query from the visited MSC. The SCP executes a service portion in response to the call treatment instruction transited through the HLR or directly from an exchange when the mobile subscriber is located in the visited service area and enters the short digit dial number for the called party. The service portion returns an indication with respect to the called party which typically includes a complete B-number for the called party. The subscriber's call is then terminated using the B-number in a conventional manner.

In a yet further aspect, the present invention is directed to a radio telecommunications network system that enables a mobile subscriber roaming in visited exchange to originate a call by entering an abbreviated number. The network system is comprised of a home service area, with one or more exchanges, that is served by an SCP and possibly an HLR. Also included in the network system is a visited service area having one or more exchanges. All exchanges have an identity indicator, while those in the visited service area have a type parameter in addition. The network system supports an SDD scheme for the mobile subscriber whereby the subscriber can originate calls from the visited exchanges in the home service area or the visited service area using an abbreviated number. The network system includes first data set means for maintaining the mobile subscriber's subscription information data and a first plurality of digit portions. The digit portions are selectively prepended for a call originated by the mobile subscriber from the home service area by entering an abbreviated number for a called party. Also included is second data set means for maintaining a list of the identity indicators, type parameters and a second plurality of digit portions for the visited exchanges in the visited service area. There are detecting means in the SCP for detecting if the mobile subscriber is located in a visited exchange of the visited service area. Responsive to the detecting means, when a call is placed by the mobile subscriber by entering an abbreviated number in the visited exchange of the visited service area, there are Automatic Roaming Analysis (ARA) means in the SCP for converting the abbreviated number, wherein the conversion is based on the visited exchange's type and results into a called party's number. There are also means for transmitting the called party's number to the visited exchange so that the call is routed to the called party.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

The innovative teachings of the present patent application will be described with particular reference to numerous exemplary embodiments. However, it should be understood that this class of embodiments provides only a few examples of the many advantageous uses of the innovative teachings contained herein. In general, statements made in the specification of the present application do not necessarily limit any of the various claimed aspects of the present invention. Moreover, some statements may apply to some inventive features but not to others.

Figure 1:
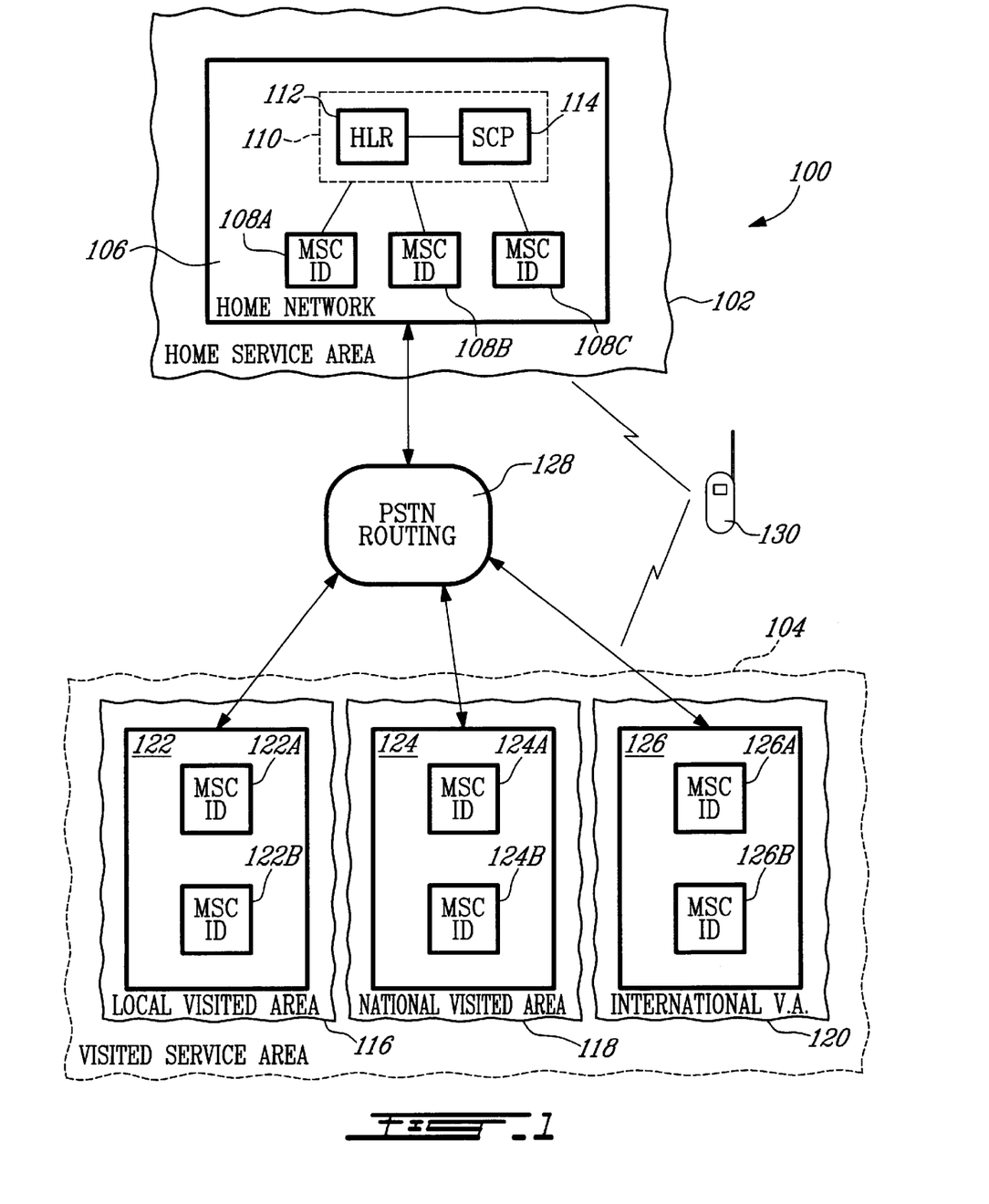
FIG. 1 is a functional block diagram which illustrates an exemplary radio telecommunications network system covering a plurality of service areas where an outgoing call originated by a mobile subscriber by using an abbreviated number is selectively built up based on the mobile subscriber's location in accordance with the teachings of the present invention.

In the drawings, like or similar elements are designated with identical reference numerals throughout the several views, and the various elements depicted are not necessarily drawn to scale. Referring now to FIG. 1, depicted therein is a functional block diagram illustrating an exemplary radio telecommunications network system 100 provided as a Wireless Intelligent Network (WIN). The network system 100 covers a geographic area that comprises a plurality of service areas, for example, a home service area 102 and a consolidated visited service area 104, where a mobile subscriber 130, symbolically shown herein as a mobile station, may be located.

The home service area 102 is controlled by a home network 106 which comprises one or more mobile switching centers (MSCs), each having an identification indicator (MSCID). For example, three MSCIDs, labeled with reference numerals 108A, 108B and 108C, respectively, are shown herein. The MSCs are operably associated with a Home Location Register (HLR) 112 and a Service Control Point (SCP) 114 to form the home network 106 to serve the mobile subscriber's home service area 102. As is well-known in the art, the HLR 112 and SCP 114 may be co-located as part of a home service node 110, although in some exemplary embodiments they may be provided as separate entities. The HLR 112 is provided primarily to keep track of the mobile subscriber's location and service profile, and to deliver routing information to interrogating MSCs, either from the home service area 102 or from the consolidated visited service area 104. The SCP 114 is the subsystem that executes various WIN service portions based on the information stored in the subscriber's service data for providing subscriber services.

The consolidated visited service area 104 may preferably comprise one or more local visited areas, for example, local visited area 116; one or more national visited areas, for example, national visited area 118; and one or more international visited areas, for example, international visited area 120. The local visited area 116 is served by a local visited network 122 which comprises one or more MSCs, each having an associated MSCID. For example, two MSCIDs, labeled with reference numerals 122A and 122B, respectively, are shown as part of the local visited network 122. In a similar fashion, an exemplary national visited network 124, comprising MSCID 124A and MSCID 124B, and an exemplary international visited network 126, comprising MSCID 126A and MSCID 126B, are provided to serve the national visited area 118 and the international visited area 120, respectively. A Public Switched Telephone Network (PSTN) network 128 may be interconnected among the home network 106 and each of the visited networks, local visited network 122, national visited network 124 and international visited network 126, for providing a suitable routing pathway among the participating MSCs that comprise the WIN system 100.

Based upon the foregoing that it should be appreciated that the visited MSCIDs (that is, participating MSCIDs that serve the consolidated roaming or visited service area 104) are organized into three types relative to the mobile subscriber's home network: (i) local MSCIDs, (ii) national or regional MSCIDs and (iii) international MSCIDs. In accordance with the teachings of the present invention, the visited MSCIDs are tagged in the SCP 114 with a type indicator which is used in reconstructing an abbreviated number entered by the roaming mobile subscriber, as will be described in greater detail hereinbelow.

Figure 2:
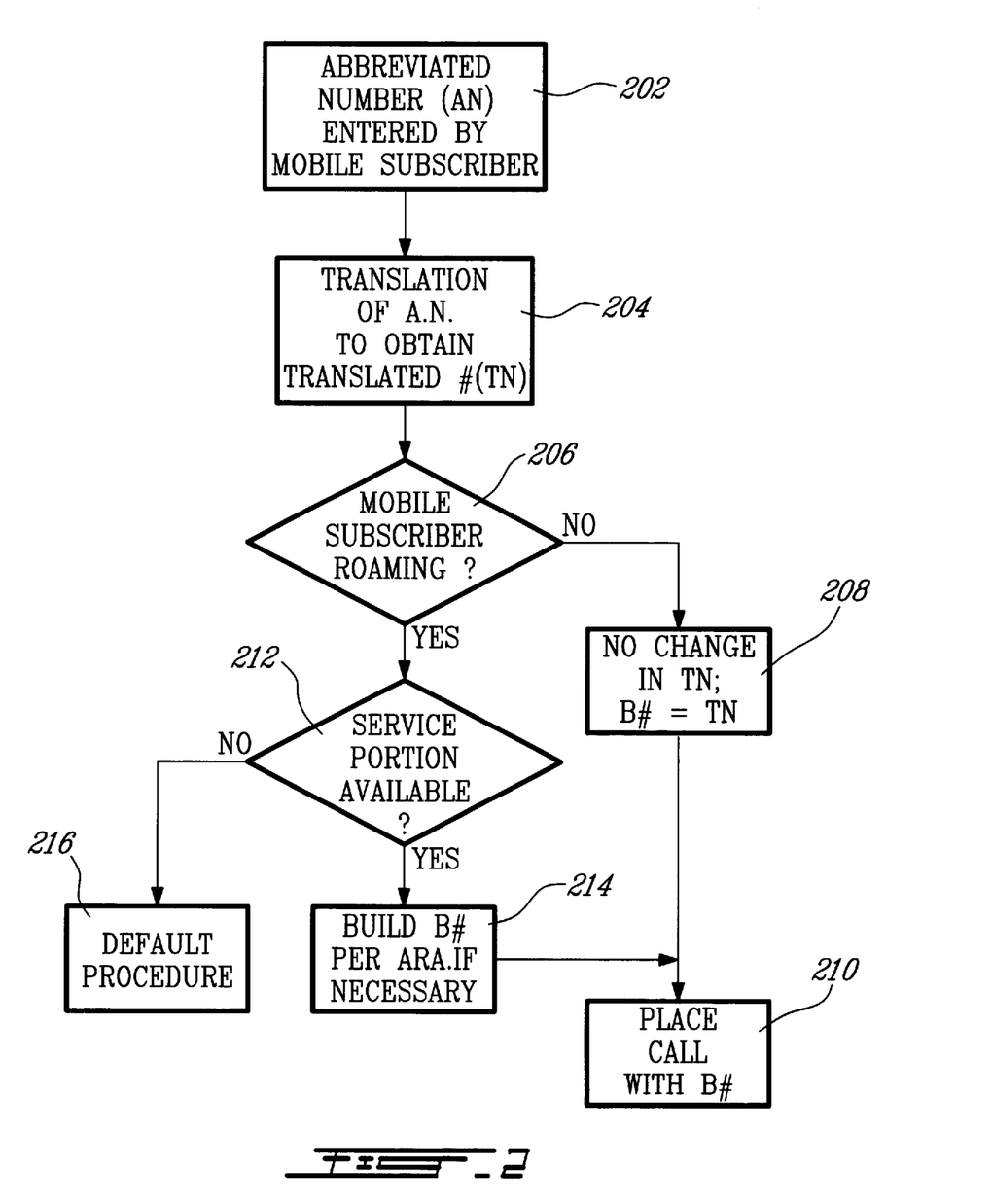
FIG. 2 depicts a flow diagram illustrating an exemplary short digit dialing process embodying the teachings of the present invention.

Referring now to FIG. 2, a flow diagram is shown which illustrates an exemplary short digit dialing (SDD) process available to a roaming mobile subscriber in accordance with the teachings of the present invention. The SDD process preferably employs a subscriber service, referred to hereinafter as the Automatic Roaming Analysis (ARA) service. The ARA service, embodying the teachings of the present invention, is provided as a call originating service (that is, Originating Triggered service) to which a cellular telephony user (A-subscriber) may subscribe. Originating services are defined as services that have an Originating Service Trigger and are invoked when a subscriber is the originator of a call (the A-subscriber). The services are triggered by the calling party number or A-number. Preferably, provisioning of the Originating Triggers is preformed by the HLR 112 of the home service node 110.

In addition to the ARA service, to which the present invention is particularly directed, possible originating services may include the following: (i) End-User Control (EUC); (ii) Private Numbering Plan (PNP); (iii) Bulk Number Translation (BNT); (iv) Outgoing Call Allowance (OCA); (v) Outgoing Call Restriction (OCR); and (vi) Closed Group Dialing (CGD).

Within the context of the present invention, in one sense, all MSCs (or, exchanges) may be considered as "visited exchanges," including those of the home network 106 serving the home service area 102. And, a home service area of a mobile subscriber, such as the home service area 102 shown in FIG. 1, may be defined in terms of a service to which the mobile subscriber subscribes, and whether it is activated or not while located in the home service area. Accordingly, the home service area 102 of the network 100 may also be viewed as the service area where the ARA service of the present invention is not activated and the consolidated visited service area 104 is the collection of services areas where the ARA service is activated.

Specifically, the ARA service provides intelligence in a wireless network such as, for example, the WIN system 100 shown in FIG. 1, by allowing a subscriber to dial an abbreviated number for a called party while roaming in the geographic area that is covered by the participating MSCs of the network. The call treatment method is designed to yield the same result as if the abbreviated number was dialed from the subscriber's home network.

Continuing to refer to FIG. 2, the abbreviated number (AN) entered by the mobile subscriber (step 202) is first translated in order to obtain a translated number (TN), as shown in step 204. Preferably, the translation is performed by executing an ancillary service such as, for example, a Bulk Number Translation (BNT) service or a Private Number Plan (PNP) service. The ARA service analyzes the location of the calling subscriber in relation to the subscriber's home network area to determine if the subscriber is roaming, as provided in the decision block 206. If the calling subscriber is not roaming, no modification to the existing TN will occur (step 208). The call is then placed using the TN as the B-number (step 210).

If roaming is detected in the SCP 114, as determined by the decision block 206, a further determination is made (decision block 212) to check whether an appropriate ARA service is available for the mobile subscriber. If so, the TN value will be analyzed and rebuilt per ARA service portions (step 214) which will be described in greater detail hereinbelow in reference to FIGS. 3 and 4. Otherwise, a default procedure may preferably be provided (step 216). In some implementations, such default procedures may include providing a pre-recorded announcement or an error indication to the calling subscriber. Alternatively, the default procedure may be such as where the call could be allowed to go through in accordance with the operator's choice.

In accordance with the teachings of the present invention, the TN value is rebuilt based on the originating location of the mobile subscriber. Certain digits, representing one or more telephone number codes commonly used in the telephone service industry, are selectively concatenated (or, "prepended") to the TN value or deleted therefrom. These codes preferably comprise the following: (i) an International Access Code (IAC), (ii) a Country Code (CCD), (iii) a National or Regional Area Code (NAC), and (iv) a local Area Code (ACD). The exact combination of digits to be concatenated to the TN value is dependent on the location of the calling subscriber and on the location of the terminating party (i.e., called party).

In order to achieve the appropriate combination of the additional digits, numbering information/data related to the location of the A-subscriber (calling party or call originating party) as well as numbering information/data related to the subscriber's home network (for example, subscription data for the ARA service) are provided in an appropriate database. Accordingly, preferably a list of the IAC, NAC, CCD and ACD values is provided as customer data for the home network (for example, the home network 106 shown in FIG. 1) and as globally defined operator service data for each defined MSC participating in the network and likely to be visited by the ARA subscriber. Furthermore, the global data set is preferably indexed with the MSCID type information described hereinabove for determining the appropriate digit information to be added or prepended to the TN value.

Figure 3A:
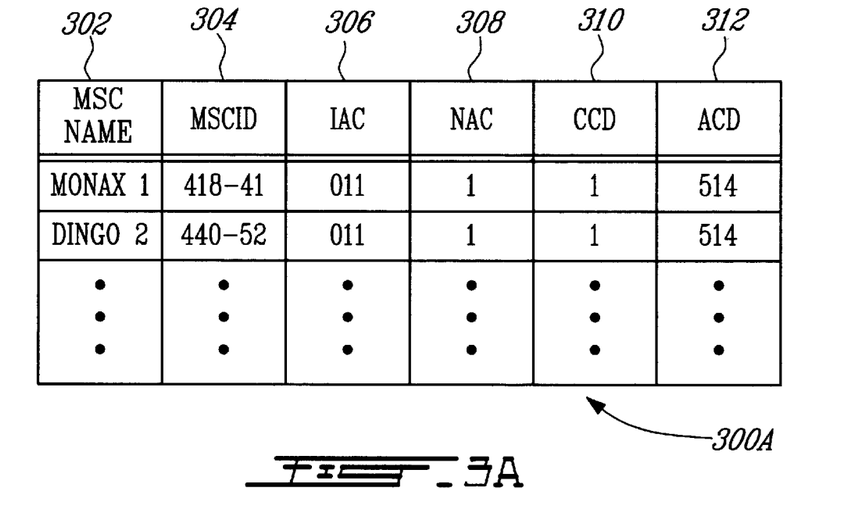
FIGS. 3A and 3B depict a presently preferred exemplary embodiment of a subscriber data set and an operator service data set provided with respect to the mobile subscriber's home and visited service areas, respectively.
Figure 3B:
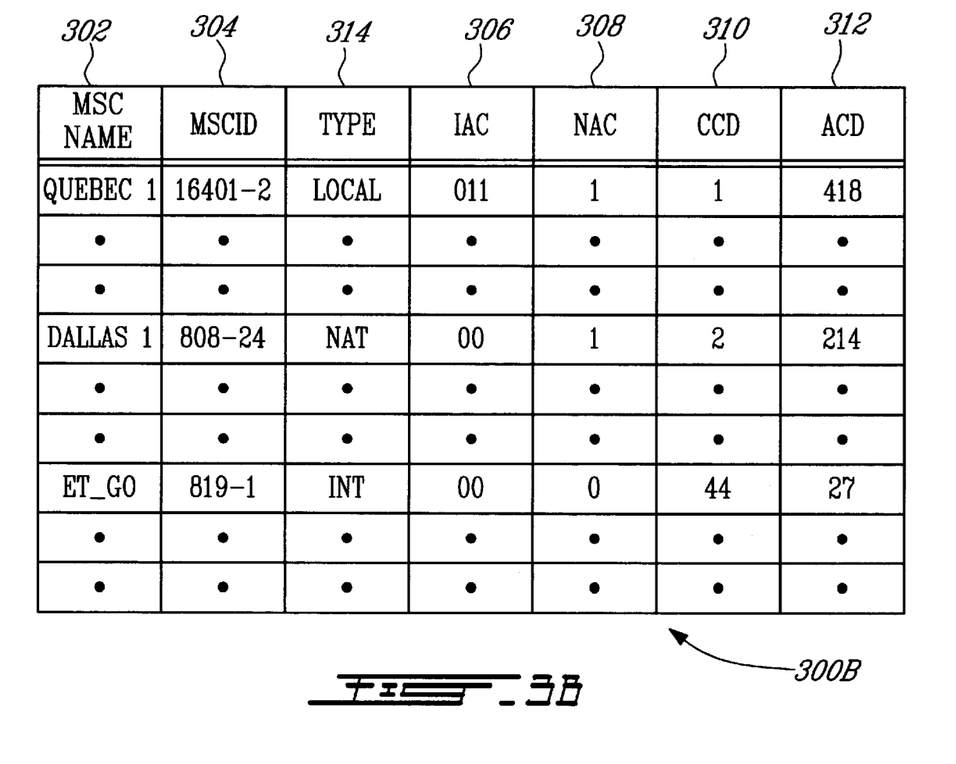

FIGS. 3A and 3B depict a presently preferred exemplary embodiment of the customer and global data sets, 300A and 300B, respectively, in tabular form, provided in accordance with the teachings of the present invention in the SCP 114. The customer data set 300A (also referred to as end-user subscription data, which is provided for each ARA Service subscriber) preferably comprises an MSC-Name portion 302, a home MSCID portion 304, an IAC portion 306, an NAC portion 308, a CCD portion 310, and an ACD portion 312. Each entry in the MSC-Name portion 302 comprises an alphanumeric alias for a corresponding MSCID of the MSCs serving the home network area. Further, appropriate values for each of the code portions are entered for the named home MSCs. For convenience, accordingly, the code portions of the customer data set 300A may hereinafter be referred to as home IAC (H-IAC), home NAC (H-NAC), home CCD (H-CCD) and home ACD (H-ACD), respectively.

The global data set 300B (also referred to as operator service data set) is defined by the operator of the radio telecommunications network as a list of all visited MSCIDs for each subscriber, and corresponding code and type portions. As can be readily appreciated, the portions of the global data set 300B are quite similar to those described above with reference to the customer data set 300A, except that the global data set 300B also comprises a type portion 314 for tagging the visited MSCIDs of the network. As explained in the foregoing discussion, the presently preferred exemplary embodiment of the operator service data set 300B includes three types of the visited MSCIDs: local, national and international. Accordingly, each of the visited MSCIDs provided in the MSCID portion is tagged with a type indicator: LOCAL, NAT or INT, as appropriate. Once again, for convenience, the code portions of the data set 300B may hereinafter be referred to as visited IAC (MSC-IAC), visited NAC (MSC-NAC), visited CCD (MSC-CCD) and visited ACD (MSC-ACD), respectively.

In the presently preferred exemplary embodiment of the present invention, the telephone code values, IAC, NAC, CCD and ACD, described in the foregoing, preferably comprise up to four digits. It should be appreciated, however, that the ACD code may be nonexistent in some instances where certain countries do not require an Area Code.

The ARA service of the present invention, provided as a call originating service, is invoked upon the identification of the service key (the A-number) and the Originating Trigger of the subscriber in the serving MSC. If the subscriber is roaming in an area served an MSC that supports ANSI-41 signaling, the ARA service is invoked upon the identification of the Origination Trigger. Preferably, the originating MSC supports an Originating Access message (IS-41+) or an Originating Request message (ANSI-41) between the MSC and the HLR or SCP. In addition to having a subscription to the ARA service defined in the SCP, the subscriber is preferably required to have the appropriate originating category in the HLR.

Initially, the ARA service detects if there has been a translation of the abbreviated number to generate a TN. In addition, the logical service flow of the ARA service preferably detects if the calling subscriber is roaming outside the subscriber's home service area by verifying whether the MSCID received corresponds to the subscriber's MSCID provided in the customer data set 300A. If it does not match, then the calling subscriber is deemed to be roaming and the ARA service preferably proceeds with the comparison of the TN for rebuilding the B-number.

It should be appreciated upon reference hereto that the subscriber categories with originating triggers are preferably transferred to the MSC in which the subscriber is roaming, as this will ensure that the HLR/SCP 112/114 (shown in FIG. 1) is queried during call setup. The subscriber's HLR 112 is queried during call setup preferably such that the originating category causes the HLR 112 to query the SCP 114 for appropriate call treatment directions. In some instances, the SCP 114 may be directly queried during call set up without going through the HLR 112.

Figure 4A:
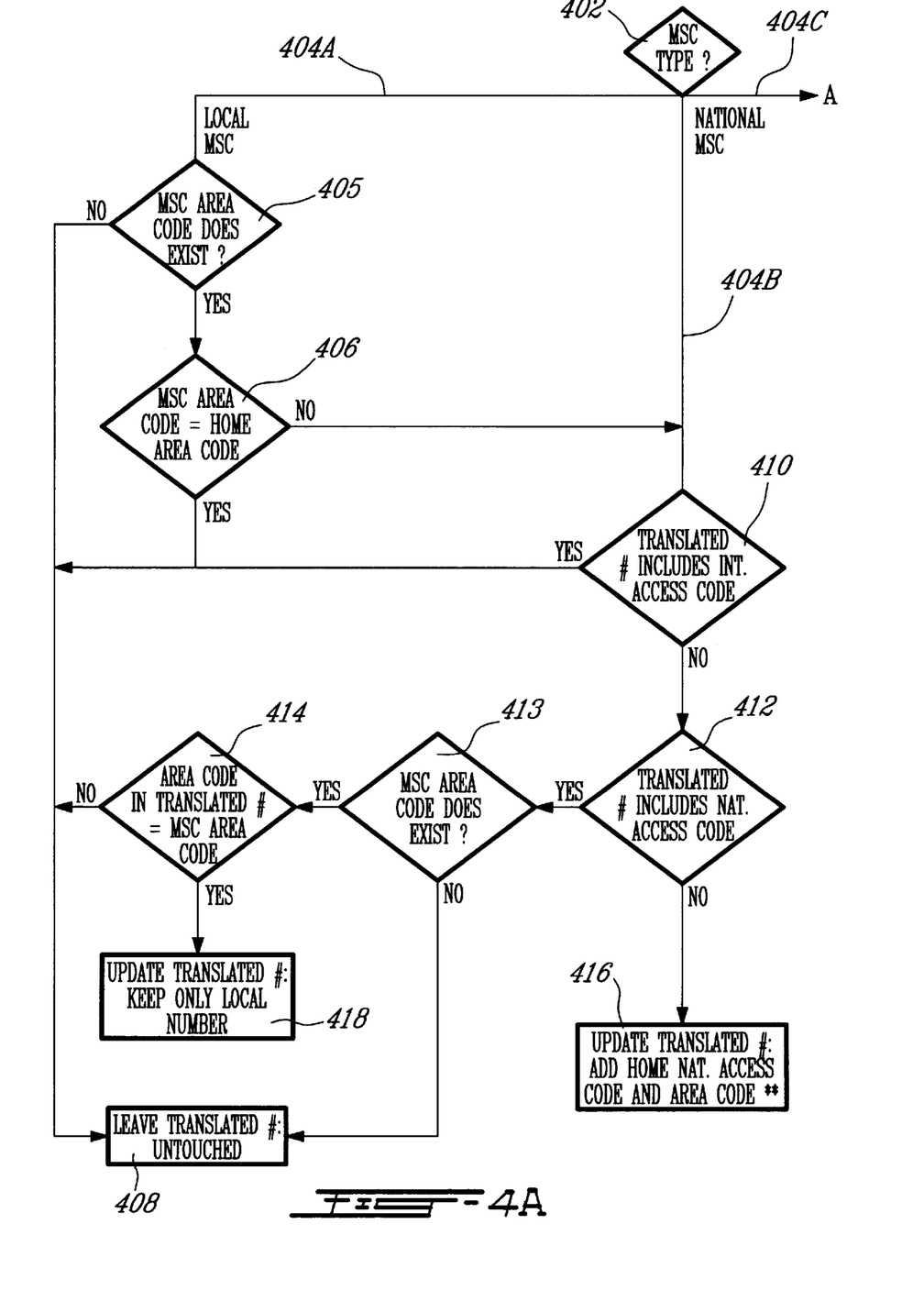
FIG. 4 depicts a flow diagram illustrating a presently preferred exemplary embodiment of a call number building process in accordance with teachings of the present invention.
Figure 4B:
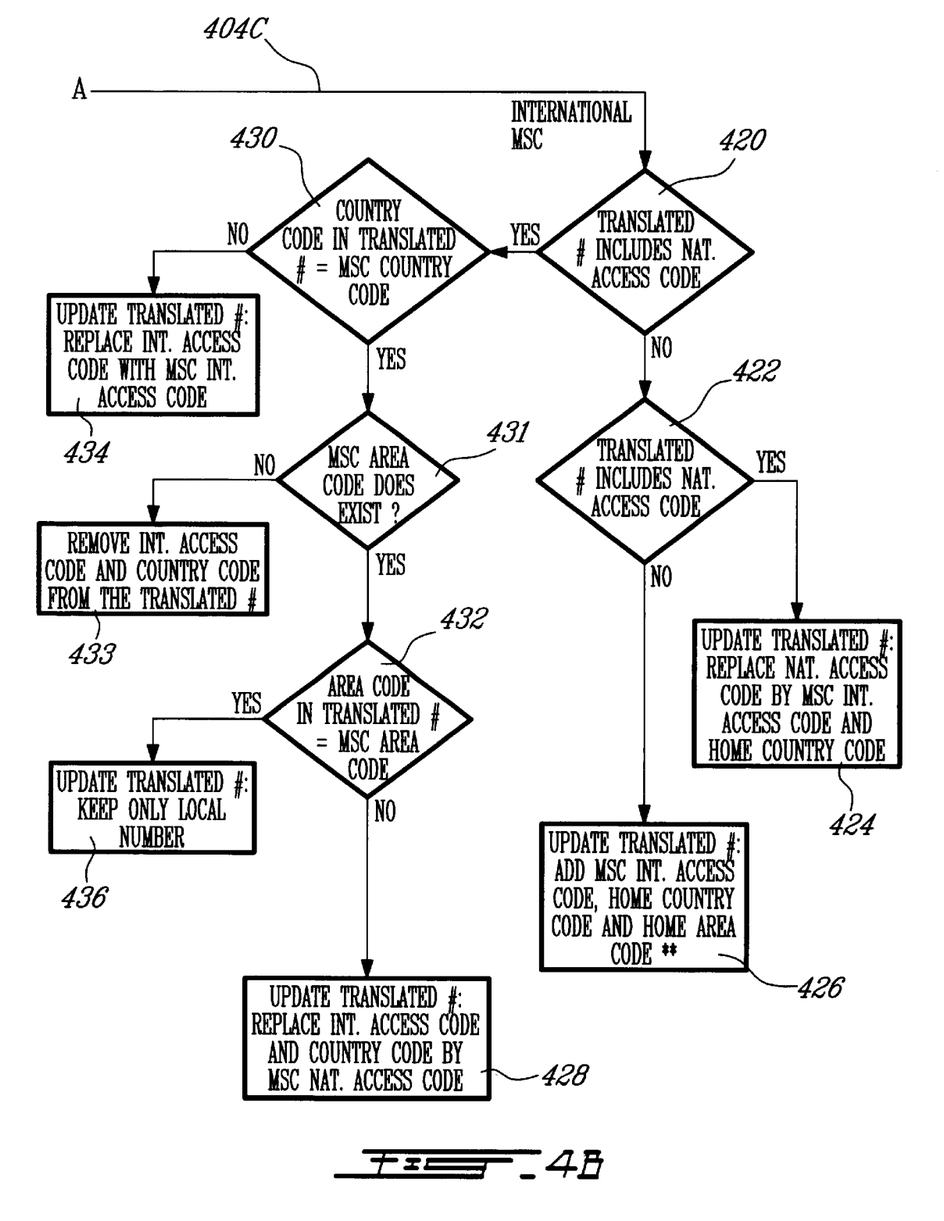

Referring now to FIG. 4, depicted therein is a flow diagram which illustrates a presently preferred exemplary embodiment of a call number building process provided in accordance with the teachings of the present invention as part of the ARA service described above. The process begins by determining the type of the visited MSCID (step 402) from where the mobile subscriber originates a call using the short digit dialing. Corresponding to the three types described hereinabove, three separate paths, a local MSCID path 404A, a national MSCID path 404B and an international MSCID path 404C, are provided. Upon determining the MSCID type, one of these paths is taken for further analysis. Depending on certain flow control conditions, some of the paths may have common flow segments, as will be described hereinbelow.

After taking the local MSCID path 404A, a determination is made (decision block 405) to verify if the MSC-ACD exists. If not, the translated number, that is, TN is left intact without further processing (step 408) and the call is terminated with the TN as the B-number. If the MSC-ACD exists, then a further determination is made (decision block 406) to verify if the home ACD equals the MSC-ACD. If so, the TN is again left intact without further processing (step 408). If the type determination in the decision block 402 yields a national MSCID type or if the home ACD is not equal to the MSC-ACD, then the flow control enters a decision block 410 where it is determined whether the TN includes an IAC. If the TN includes the IAC, the TN is again left intact without further processing (step 408). Again, the call is terminated using the unmodified TN as the B-number.

If the decision block 410 determines that the TN does not include the IAC, a following decision block 412 determines whether the TN includes an NAC. If so, it is again verified whether the MSC-ACD exists (decision block 413). If not, the TN is again left intact without further processing (step 408). Otherwise, the ACD in the TN is verified if it is equal to the MSC-ACD (decision block 414). If so, the TN is updated by keeping only the local number part and discarding the rest of the digits (step 418). The updated TN is then used as the B-number for call termination.

If the decision block 414 determines that the ACD portion of the TN is not equal to the MSC-ACD, then the TN value is left intact (step 408) and used as the B-number. If the decision block 412 determines that the TN does not include the NAC, the TN is updated by prepending an appropriate home NAC and home ACD (step 416), as provided in the subscriber data set 300A. The prepended value is then used as the B-number for call termination. It should be appreciated that the home ACD is added only if it exists. Otherwise, the TN is rebuilt without it.

If the type determination in the decision block 402 yields an international MSCID type, the international MSCID path 404C is taken for further analysis. A decision block 420 first determines whether the TN includes an IAC. If so, a following decision block 430 determines if the CCD portion of the TN equals the MSC-CCD. If not, the TN is updated by replacing the IAC of the TN with the MSC-IAC provided in the operator data set 300B (step 434). The rebuilt TN is then used for the call termination process.

If the CCD portion in the TN equals the MSC-CCD, as determined by the decision block 430, the flow control then enters a decision block 431 where it is determined if the MSC-ACD exists. If not, the IAC and CCD portions are removed from the TN (step 433). The modified TN is then used for call termination. If the MSC-ACD exists, a following decision block 432 determines whether the ACD portion in the TN equals the MSC-ACD. If so, the TN is updated by keeping only the local number part (step 436) and discarding the remaining portions thereof. On the other hand, if the TN-ACD does not equal the MSC-ACD, the TN is rebuilt by replacing the IAC and CCD portions with the MSC-NAC (step 428).

If the decision block 420 determines that the TN does not include an IAC, a following decision block 422 determines whether the TN includes an NAC. If so, the TN is updated by replacing the TN-NAC with MSC-IAC and home CCD, as provided in step 424. Otherwise, the TN is rebuilt by prepending MSC-IAC, home CCD and home ACD (step 426). Once again, it should be apparent that the home ACD is used only if it exists.

It should be readily apparent to those of ordinary skill in the art upon reference hereto that the presently preferred exemplary embodiment of the call number building process described hereinabove may also be provided with a variety of error handling sub-processes such as, for example, exception handling, service portion error handling, and SCP error handling. Exception handling in the ARA service of the present invention may include such conditions as: blocked subscriber conditions, blocked service condition, and undefined MSCID location condition. Upon the occurrence of these conditions, the ARA service may preferably return an announcement code to the HLR and may halt service processing in the SCP. Service portion error handling in the ARA service occurs when the service portions detect a condition which prevents the service portions from finishing off their processing. Upon the occurrence of one of these conditions, the ARA service preferably sets up an error code for diagnostics, et cetera, and halts service processing in the SCP. Errors that occur during service execution and are not detected by a service portion are referred to as SCP error handling conditions. Preferably, these conditions result in appropriate error codes for diagnostics, monitoring, et cetera.

Figure 5:
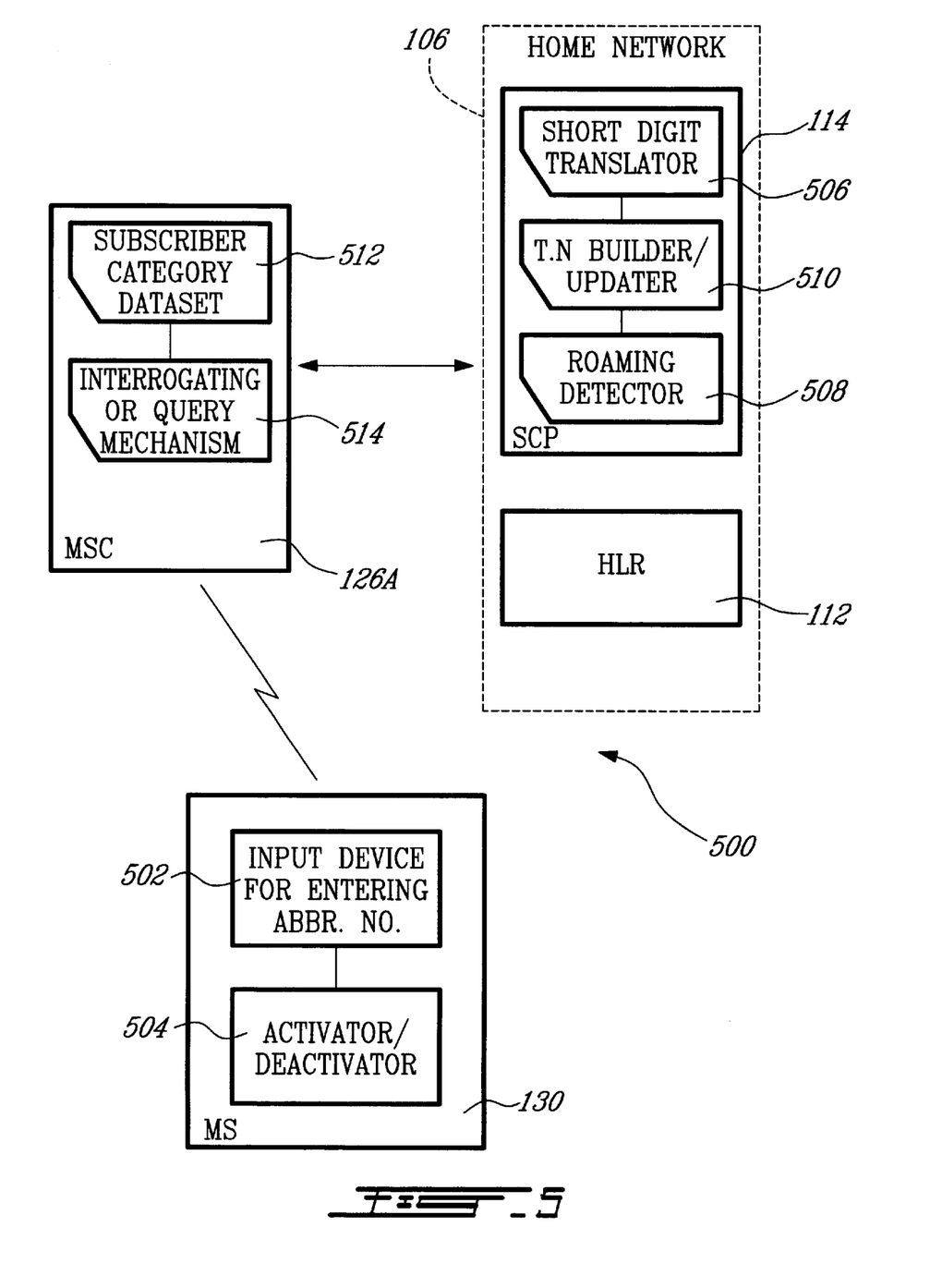
FIG. 5 is a functional block diagram of a network portion of an exemplary radio telecommunications network system that supports a short digit call process provided in accordance with teachings of the present invention.

Referring now to FIG. 5, depicted therein is a functional block diagram of a network portion 500 of the exemplary radio telecommunications network 100 shown in FIG. 1. The network portion 500 is provided in accordance with the teachings of the present invention for supporting short digit dialing for the roaming mobile subscriber 130, illustrated herein as a functional block equivalent of a mobile phone. The mobile subscriber 130 uses an input device 502, preferably available as part of the mobile phone, for entering a short digit or abbreviated number when it desires to originate a call. Also, an activator/deactivator 504 is available to the mobile subscriber 130 for selectively activating or deactivating the ARA service described hereinabove. Preferably, the activator/deactivator 504 is available only to those mobile subscribers having a subscription to an End-User Control (EUC) service, in addition to the ARA service.

An exemplary visited exchange in the consolidated visited service area 104, for example, the MSC 126A, serves the visiting mobile subscriber 130. The exchange 126A preferably comprises a data set 512 for storing the subscriber category information transferred thereto. This subscriber category information ensures that the HLR/SCP is queried during call setup. Accordingly, a suitable interrogating mechanism 514 is provided therefor which complies with applicable signaling protocols. The home network 106, comprising the HLR 112 and the SCP 114, inter alia (shown in FIG. 1), is provided with a short digit translator 506 in the SCP 114 (for example, a PNP or BNT mechanism) to convert the abbreviated number entered by the mobile subscriber 130 into a translated number. A roaming detector 508 is provided in the SCP 114 to detect whether the mobile subscriber 130 is in a visited area. A mechanism 510 is also provided as part of the home network (in the SCP 114) to build and update the translated number for generating a suitable B-number in accordance herewith.

Figure 6A:
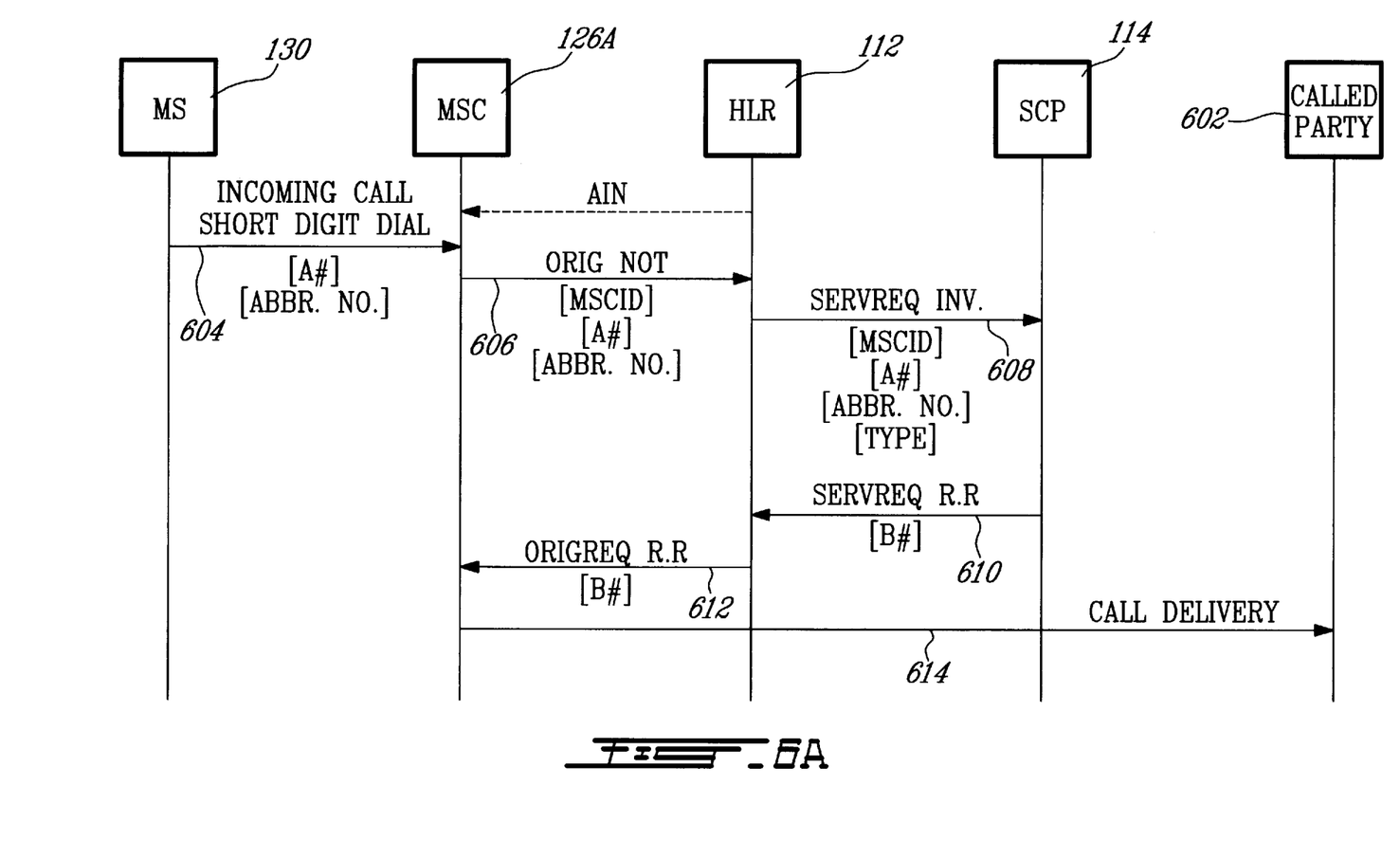
FIGS. 6A, 6B and 6C depict examples of signal flow with respect to an exemplary short digit dialing process provided in accordance with teachings of the present invention.
Figure 6B:
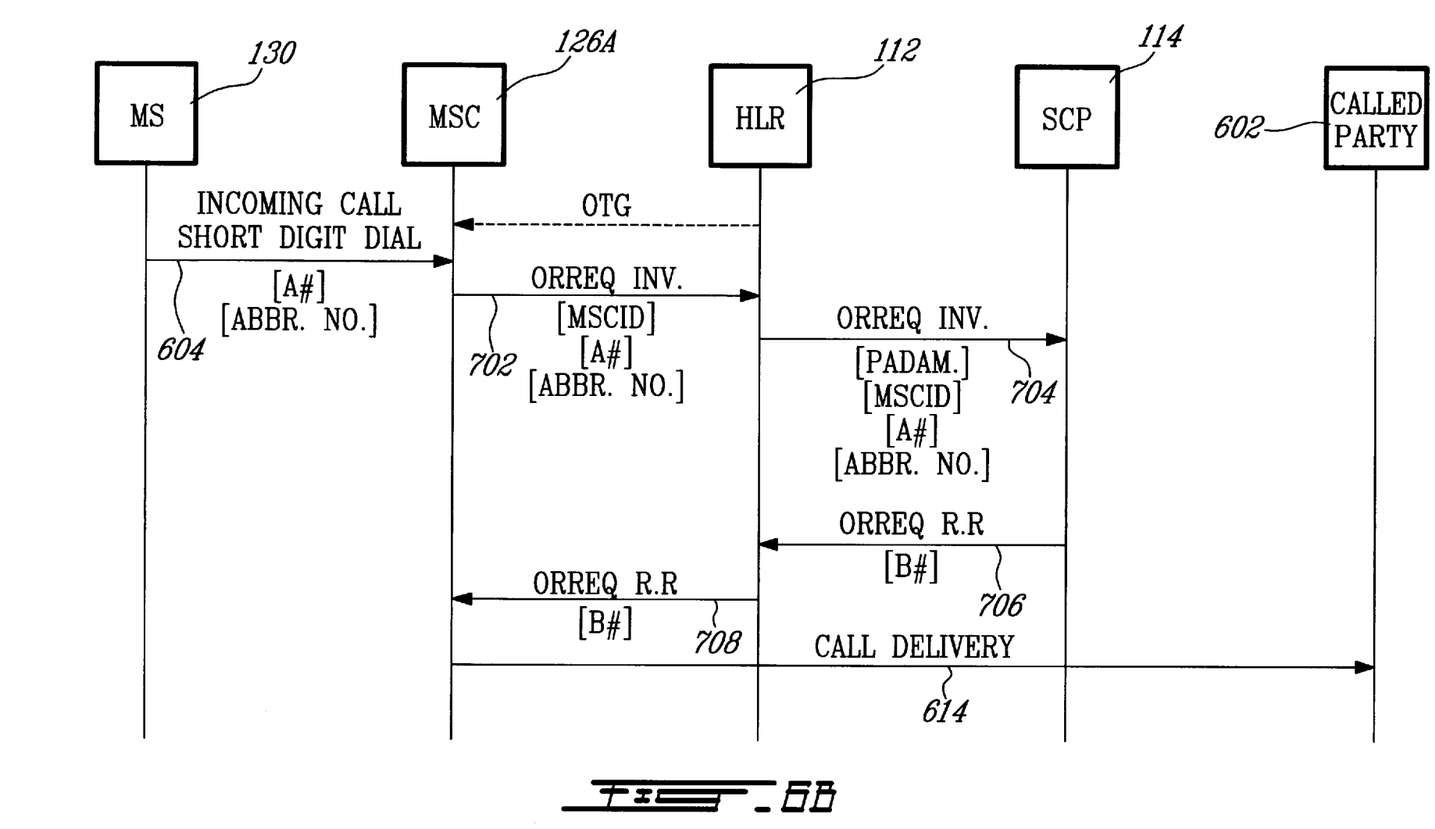
Figure 6C:
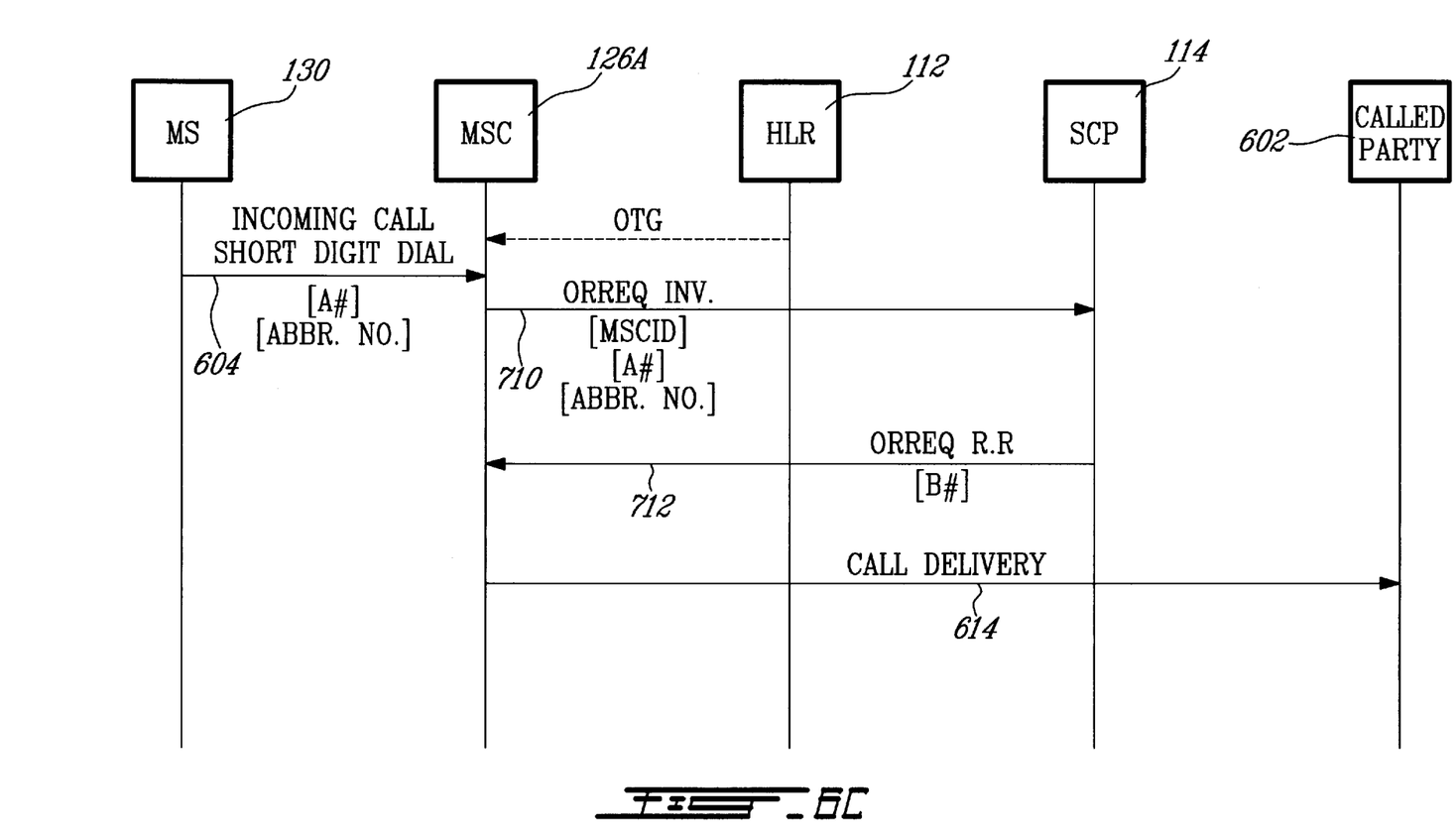

FIGS. 6A, 6B and 6C depict examples of signal flow which illustrate the signaling required for supporting short digit dialing in accordance with the teachings of the present invention. Referring in particular to FIG. 6A, the AIN is shown as the originating trigger. When the mobile subscriber 130 dials an abbreviated number (signal path 604), the [A#] and [ABBR. NO.] are transmitted to the MSC 126A along therewith. By way of an Originating Request (ORIGNOT) Invoke message (signal path 606), the visited MSC 126A passes the [MSCID], [A#] and [ABBR. NO.] information to the home HLR 112. The HLR 112 provides a Service Request (SERVREQ) Invoke message to the SCP with appropriate parametric information such as shown in signal path 608.

It may preferably be provided that any originating translation service is executed first for the mobile subscriber 130, thus ensuring that an appropriate short digit translation process precedes the ARA service portion. After the SCP executes the appropriate portion of the call number building process provided in accordance with the teachings of the present invention, a B-number is returned to the HLR via a SERVREQ Return Result message path 610, which is then propagated to the visited MSC 126A via the Originating Request Return Result message path 612. The call originated by the mobile subscriber 130 is then terminated with the B-number of a called party 602 (call delivery path 614).

FIG. 6B depicts a second example of the signal flow for the SSD process. It should be appreciated that this example is similar to one provided in FIG. 6A, and accordingly, only salient features are described herein. The OTG is provided as the originating trigger in this embodiment. Upon receiving the Incoming Call 604, the Originating Request Invoke (ORREQ) message 702 is provided from the MSC 126A to the HLR 112, including the parametric information as depicted. The parametric information is then passed to the SCP 114 by propagating the ORREQ Invoke message 704 thereto. The B# is subsequently returned from the SCP 114 by way of the ORREQ Return Result message segments, 706 and 708. The call then is terminated with the B# of the called party 602 as shown by the call delivery path 614.

In some instances, the appropriate parametric information may be passed directly from an exchange to the SCP. This scenario is exemplified in FIG. 6C. It should be readily apparent to one of ordinary skill in the art that the signal flow herein is substantially similar to one described in reference to FIG. 6C. The ORREQ Invoke message 710 is directly received by the SCP 114 from the MSC 126A, along with the appropriate parameters as shown. Subsequently, the B-number is sent to the exchange, MSC 126A, for effectuating the call delivery path 614.

Based upon the foregoing, it should now be apparent to those of ordinary skill in the art that the present invention provides an advantageous solution which allows a mobile subscriber to dial abbreviated numbers while roaming in plural types of visited exchanges as if the abbreviated number was dialed from the subscriber's home network. It especially provides an attractive service for end users who wish to support international short digit dialing. By means of the ARA service of the present invention, the end user is able to continue to use short digit dialing regardless of its location. It should further be appreciated that the ARA service may be regarded as an innovative enhancement to the popular Wireless Virtual Private Network (WVPN) solutions available today.

Although the system and method of the present invention have been described in particular reference to certain radio telecommunications messaging standards (for example, the ANSI-41 standard), it should be realized upon reference hereto that the innovative teachings contained herein are not necessarily limited thereto and may be implemented advantageously with any applicable radio telecommunications standard.

In addition, it is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow. For example, as an optional feature, a subscriber could supply a list of B-numbers (non-SDD numbers) that would be tagged as using the ARA functionality such that the subscriber may dial the numbers in a roaming area as if the dialing was done from the home network. In this way, there may be no need for executing a short digit translation service prior to the ARA service.

Further, ARA subscriptions may be defined for groups of subscribers, called Selective User Groups (SUGs). It should be appreciated that although the teachings of the present invention have been exemplified by way an individual subscriber, they are equally applicable for SUGs, mutatis mutandis.

While it is possible that the ARA service may interact with other WIN services using the same originating category, it is contemplated that such interactions are resolved within the ambit of the present invention.

Furthermore, it should be appreciated that the ARA service of the present invention may be extended to include the option wherein certain telephone codes are not provided or needed, as is the case with some visited exchanges. For example, in some countries, there is no ACD code and only an IAC/CCD/NAC combination is prepended to the local number. Moreover, based on the foregoing discussion with reference to FIG. 4, it should be clear that the call number rebuilding process may include prepending, appending, substituting, replacing, transposing, adding, updating, concatenating, inserting, deleting, discarding, or otherwise manipulating or leaving intact one or more digits of the TN. Therefore, the phrase "rebuilding" is contemplated to comprehend all such digit manipulations within the grasp of the present invention.

Accordingly, it should be understood by those of ordinary skill in the art that all these and other such permutations, combinations, rearrangements and extensions of the innovative teachings contained herein are expressly deemed to be part of the scope of the present invention which is solely limited by the following claims.

What is claimed is:

1. A radio telecommunications network system covering a geographic area comprised of a plurality of service areas each of which is served by a mobile switching center (MSC) having an identification indicator (MSCID), the system including:
   (A) a Service Control Point (SCP) which comprises:
      (A1) a customer service data set associated with a mobile subscriber, the customer service data set including a first plurality of telephone number code portions associated with an MSC serving a home service area of the mobile subscriber, the code portions comprising at least one code portion selected from a group consisting of; a mobile switching center (MSC) name portion, home mobile switching center identification indicator (MSCID) name portion, Intenational Access Code (IAC) portion, National Access Code (NAC) portion, Country Code (CCD) portion and an Area Code (ACD) portion;
      (A2) an operator service data including a second plurality of telephone code portions associated with a visited MSC serving a visited service area, and a type portion for designating a type parameter for the visited MSC; and
      (A3) roaming detecting means for detecting whether the mobile subscriber is located in the visited service area;
   (B) means available to the mobile subscriber for entering a short digital number associated with a called party's telephone number; and
   (C) means for generating a call treatment instruction in response to a service query from the visited MSC,
   wherein the SCP executes a service portion in response to the call treatment instruction provided, when the mobile subscriber is located in the visited service area and enters the short dial number for the called party, the service portion returning an indication with respect to the called party.

2. The radio telecommunications network system as set forth in claim 1, wherein the service portion is based on the type parameter of the visited MSC and the indication comprises the called party's telephone number for call routing.

3. The radio telecommunications network system as set forth in claim 2, wherein the type parameter of the visited MSC comprises a national MSC type and the visited service area is a national visited service area.

4. The radio telecommunications network system as set forth in claim 2, wherein the type parameter of the visited MSC comprises a regional MSC type and the visited service area is a regional visited service area.

5. The radio telecommunications network system as set forth in claim 2, wherein the type parameter of the visited MSC comprises an international MSC type and the visited service area is an international visited service area.

6. The radio telecommunications network system as set forth in claim 2, wherein the type parameter of the visited MSC comprises a local MSC type and the visited service area is a local visited service area.

7. The radio telecommunications network system as set forth in claim 1, further including means in the SCP for translating the short digit dial number entered by the mobile subscriber.

8. The radio telecommunications network system as set forth in claim 1, wherein the second plurality of telephone number code portions comprises at least one code portion selected from the group consisting of an International Area Code (IAC) portion, a National Area Code (NAC) portion, a Country Code (CCD) portion and an Area Code (ACD) portion.

9. The radio telecommunications network system as set forth in claim 1, wherein the indication comprises a code for generating an announcement.

10. A radio telecommunications network system that enables a mobile subscriber roaming in a visited exchange to originate a call by entering an abbreviated number, said network having one or more visited exchanges in a home service area that is served by a Service Control Point (SCP) and a Home Location Register (HLR), and one or more visited exchanges in a visited service area that the mobile subscriber is likely to visit, each of the exchanges having an identity indicator and the visited exchanges in the visited service area having a type parameter in addition thereto, the network system including:

first data set means for maintaining the mobile subscriber's subscription information data and a first plurality of digit portions, at least one of which digit portions is selectively prepended for a call originated by the mobile subscriber from an exchange in the home service area by entering an abbreviated number for a called party;

second data set means for maintaining a list of the identity indicators, type parameters and a second plurality of digit portions for the visited exchanges in the visited service area, at least one of which digit portions is selectively prepended for a call originated by the mobile subscriber from an exchange in the visited service area by entering an abbreviated number for the called party;

detecting means in the SCP for detecting if the mobile subscriber is located in a visited service area;

responsive to the detecting means, Automatic Roaming Analysis (ARA) means in the SCP for converting the abbreviated number entered by the mobile subscriber for originating a call when located in the visited exchange of the visited service area, the conversion being based at least in part upon the visited exchange's type and resulting into a called party's number; and means in the SCP for transmitting the called party's number to the visited exchange for routing the mobile subscriber's call to the called party.

11. The radio telecommunications network system as set forth in claim 10, further comprising a translator for translating the abbreviated number entered by the mobile subscriber when located in the visited exchange of the visited service area into a translated number, wherein the type parameter comprises a local exchange type and the translated number is provided to the ARA means.

12. The radio telecommunications network system as set forth in claim 10, further comprising a translator for translating the abbreviated number entered by the mobile subscriber when located in the visited exchange of the visited service area into a translated number, wherein the type parameter comprises a national exchange type and the translated number is provided to the ARA means.

13. The radio telecommunications network system as set forth in claim 10, further comprising a translator for translating the abbreviated number entered by the mobile subscriber when located in the visited exchange of the visited service area into a translated number, wherein the type parameter comprises a regional exchange type and the translated number is provided to the ARA means.

14. The radio telecommunications network system as set forth in claim 10, further comprising a translator for translating the abbreviated number entered by the mobile subscriber when located in the visited exchange of the visited service area into a translated number, wherein the type parameter comprises an international exchange type and the translated number is provided to the ARA means.

15. The radio telecommunications network system as set forth in claim 10, wherein the first plurality of digit portions comprises at least one code portion selected from the group consisting of an International Area Code (IAC) portion, a National Area Code (NAC) portion, a Country Code (CCD) portion and an Area Code (ACD) portion.

16. The radio telecommunications network system as set forth in claim 10, wherein the corresponding second plurality of digit portions comprises at least one code portion selected from the group consisting of an International Area Code (IAC) portion, a National Area Code (NAC) portion, a Country Code (CCD) portion and an Area Code (ACD) portion.

17. A method of supporting a short digit dialing service for a roaming mobile subscriber in a radio telecommunications system of the type which includes a plurality of visited exchanges, each with a type designation and an identity indicator (MSCID), and a home network comprising at least a visited exchange, a Home Location Register (HLR) and a Service Control Point (SCP) associated therewith, the SCP including a subscriber data set and an operator service data set, and a service execution portion relating to the short digit dialing service, the method comprising the steps of:

populating the subscriber data set with at least an International Access Code (IAC), a National Access Code (NAC), a Country Code (CCD), an Area Code (ACD) and the MSCID for the home network's visited exchange;

populating the operator service data set at least with a visited exchange's type parameter and MSCID, and an International Access Code (IAC), a National Access Code (NAC), a Country Code (CCD) and an Area Code (ACD) for a visited service area's visited exchange;

receiving a call origination in a visited exchange from a mobile subscriber who enters an abbreviated number for a called party;

receiving, in the SCP, a call treatment instruction from one of the HLR and the visited exchange, the call treatment instruction including at least the MSCID with respect to the location of the mobile subscriber;

determining, in the SCP, the type of the visited service area's visited exchange;

detecting in the SCP whether the mobile subscriber is roaming;

performing, by the SCP, a translation process on the abbreviated number to generate a translated number (TN), responsive to the detecting step;

based on the type of the visited service area's visited exchange, selectively rebuilding, in the SCP, a called party number (B-number) using the TN; and selectively terminating the call originated by the mobile subscriber using the B-number.

18. The method as set forth in claim 17, wherein the step of selectively rebuilding the called party number further comprises the step of:

if the visited exchange is a local visited exchange and if the ACD of the home network equals the ACD associated with the visited exchange, then treating the TN as equal to the B-number.

19. The method as set forth in claim 17, wherein the step of selectively rebuilding the called party number further comprises the steps of:

if the visited exchange is a local visited exchange and if home network's ACD does not equal the visited exchange's ACD, determining whether the TN includes an IAC; and if so, treating the TN as equal to the B-number.

20. The method as set forth in claim 17, wherein the step of selectively rebuilding the called party number further comprises the steps of:

if the visited exchange is a national visited exchange, determining whether the TN includes an IAC; and if so, treating the TN as equal to the B-number.

21. The method as set forth in claim 17, wherein the step of selectively rebuilding the called party number further comprises the steps of:

if the visited exchange is a national visited exchange and if the TN does not include an IAC, determining whether the TN includes an NAC;

if not, updating the TN by adding the home network's NAC and ACD; and equating the updated TN with the B-number.

22. The method as set forth in claim 17, wherein the step of selectively rebuilding the called party number further comprises the steps of:

if the visited exchange is a national visited exchange and the TN does not include an IAC but includes an NAC, determining whether an ACD of the TN equals the visited exchange's ACD; and if not, treating the TN as equal to the B-number.

23. The method as set forth in claim 17, wherein the step of selectively rebuilding the called party number further comprises the steps of:

if the visited exchange is a national visited exchange and the TN does not include an IAC but includes an NAC, determining whether an ACD of the TN equals the visited exchange's ACD;

if so, updating the TN by keeping only a local number part of the TN and deleting other portions; and treating the updated TN as the B-number.

24. The method as set forth in claim 17, wherein the step of selectively rebuilding the called party number further comprises the steps of:

if the visited exchange is an international visited exchange and the TN includes an IAC, determining whether a CCD of the TN is not equal to the visited exchange's CCD;

if so, updating the TN by replacing an IAC of the TN with the visited exchange's IAC; and treating the updated TN as the B-number.

25. The method as set forth in claim 17, wherein the step of selectively rebuilding the called party number further comprises the steps of:

if the visited exchange is an international visited exchange and the TN includes an IAC, and if a CCD of the TN equals the visited exchange's CCD, determining whether an ACD of the TN equals the visited exchange's ACD;

if so, updating the TN by keeping only a local number part of the TN and deleting other portions; and treating the updated TN as the B-number.

26. The method as set forth in claim 17, wherein the step of selectively rebuilding the called party number further comprises the steps of:

if the visited exchange is an international visited exchange and the TN includes an IAC, and if a CCD of the TN does not equal the visited exchange's CCD, determining whether an ACD of the TN equals the visited exchange's ACD;

if not, updating the TN by replacing the TN's IAC and CCD with the visited exchange's NAC; and treating the updated TN as the B-number.

27. The method as set forth in claim 17, wherein the step of selectively rebuilding the called party number further comprises the steps of:

if the visited exchange is an international visited exchange and the TN does not include an IAC, determining whether the TN includes an NAC;

if not, updating the TN by adding the visited exchange's IAC, home network's CCD and ACD; and treating the updated TN as the B-number.

28. The method as set forth in claim 17, wherein the step of selectively rebuilding the called party number further comprises the steps of:

if the visited exchange is an international visited exchange and the TN does not include an IAC, determining whether the TN includes an NAC;

if so, updating the TN by replacing the TN's NAC by the visited exchange's IAC and home network's CCD; and treating the updated TN as the B-number.

* * * * *